United States Patent [19]
Borchardt

[11] Patent Number: 5,381,309
[45] Date of Patent: Jan. 10, 1995

[54] BACKLIT DISPLAY WITH ENHANCED VIEWING PROPERTIES

[75] Inventor: Jerry L. Borchardt, Maple Grove, Minn.

[73] Assignee: Honeywell Inc., Minneapolis, Minn.

[21] Appl. No.: 130,084

[22] Filed: Sep. 30, 1993

[51] Int. Cl.⁶ ............................................. F21V 13/00
[52] U.S. Cl. ...................................... 362/31; 362/26; 362/27; 362/30; 362/331
[58] Field of Search ...................... 362/800, 26, 30, 27, 362/31, 331, 332, 333; 40/546

[56] References Cited
U.S. PATENT DOCUMENTS

| | | | |
|---|---|---|---|
| 4,714,983 | 12/1987 | Lang | 362/27 |
| 4,874,228 | 10/1989 | Aho et al. | |
| 4,922,384 | 5/1990 | Torrence | 362/31 |
| 4,984,144 | 1/1991 | Cobb, Jr. et al. | |
| 4,994,941 | 2/1991 | Wen | 362/26 |
| 5,054,885 | 10/1991 | Melby | |
| 5,070,431 | 12/1991 | Kitazawa et al. | 362/26 X |
| 5,190,370 | 3/1993 | Miller et al. | |
| 5,272,601 | 12/1993 | McKillip | 362/27 |

OTHER PUBLICATIONS

R. McCartney, et al., "S7-7 Directional Diffuser Lens Array for Backlit LCD's", Japan Display '92, pp. 259–262.

3M/Optical Systems, "Right Angle Backlighting Technology Design Aid", 15 pages.
"Brightness Enhancement Film", 10 pages.
3M product brochure 75-0500-0403-7, "Brightness Enhancement Film (BEF)", 2 pages (1993).
3M, "Diffusion Film", 6 pages.
3M product brochure 75-0500-0563-8, "Light Diffusing Film", 2 pages (1993).

Primary Examiner—Ira S. Lazarus
Assistant Examiner—Thomas M. Sember
Attorney, Agent, or Firm—Charles L. Rubow

[57] ABSTRACT

A high aspect ratio, backlit liquid crystal display in which light from opposing rows of light emitting diodes is projected into the ends of a thin optical cavity. The optical cavity is bounded by one major wall of which the interior surface is specularly reflective and an opposing major wall including a layer of transparent material having an interior surface formed with an array of regularly-spaced, fine, triangular prisms which tend to collimate light received from the cavity and project it outwardly perpendicular to the major wall. A diffusion layer overlays the layer of transparent material, and a brightness enhancing film overlays the diffusion layer and functions to convert diffuse illumination received through the diffusion layer into directed illumination predominantly falling within the a viewing space bounded by predetermined angles.

10 Claims, 4 Drawing Sheets

BACKLIT DISPLAY WITH ENHANCED VIEWING PROPERTIES

BACKGROUND OF INVENTION

The invention disclosed herein relates generally to backlighting for display panels which are at least partially translucent, and to corresponding illuminated display devices of the type incorporating backlighting from a high aspect ratio illumination source. More particularly the invention relates to such a display device and illumination source employing light emitting diodes in conjunction with an optical cavity and enhancement films to provide improved viewability from a relatively wide range of viewing angles.

There are various situations in which it is desired or necessary that information be displayed so as to be readable under a wide range of ambient light conditions and throughout a relatively wide range of viewing angles. In many of these situations it is also highly desirable, if not required, that the display apparatus be capable of automatic updating of the displayed information and/or permitting selection of the information to be displayed. Another characteristic which is desired and often important is that the apparatus be robust and require minimum maintenance.

A specific application requiring such a display device relates to monitoring the status and/or operation of environmental control equipment on mobile shipping containers for perishable goods. Such containers, which each have a refrigeration unit and/or other environmental control apparatus, may, during a single trip, be moved by train, track and/or marine vessel, and moved from one mode of transportation to another by crane or other cargo handling equipment. During the shipping process, it may be necessary to periodically check on operation of the refrigeration or other environmental control equipment and the status of environmental conditions within the container. A display device for presenting this information is typically installed at a convenient location on each container. Since it may be necessary to perform a status check at any time of the day or night and under varying climatic conditions, the display must be illuminated so as to be easily readable during daylight as well as dark conditions. Further, since the containers may be stacked as many as three high, and on platforms such as a truck or rail car bed, it may be necessary to read the display from a variety of viewing angles ranging between substantially above to somewhat below horizontal, and within a reasonable range of horizontal viewing angles.

The requirements for long life, robustness and minimum maintenance essentially dictate solid state design and construction. Thinness or high aspect ratio of the display apparatus is also an important consideration in many applications, such as the previously described shipping container environmental control and status monitoring system.

Although several flat panel technologies are available for producing illumination, such technologies including solid state florescent and electroluminescent devices, light sources based on these technologies have various disadvantages, such as high initial cost, excessive degradation of light output with time, limited useful life and/or requirements for complex driver or energization circuitry.

Light emitting diodes which produce a relatively high light output are readily available, and inexpensive, and have modest energization circuitry requirements. However, such diodes are essentially point light sources which, if used to backlight a relatively large area, must be combined with other optical elements for evenly distributing and directing the light output.

A variety of multifaceted lens products are now available for achieving a large aperture with a thin element. One such family of products includes transmissive and reflective optical films available through Minnesota Mining and Manufacturing Company, and described in U.S. Pat. Nos. 4,799,137, 4,874,228, 4,984,144, 5,054,885 and 5,190,370. These films are characterized by a major surface formed with an array regularly spaced, parallel, fine, triangular prisms which serve to redirect light received from a range of angles to a relatively uniform direction normal to the nominal plane of the film. This characteristic can be utilized to implement a thin, large aperture light source by projecting light produced by one or more point sources onto the film at a very small angle relative to the nominal plane of the film.

One of the more difficult design problems with such a light source implementation is the selection and arrangement of materials which will achieve illumination of uniform intensity and direction over the entire aperture. Uniform intensity and direction of illumination is required to avoid "hot spots", voids, streaks, an inadequate range of angles for acceptable viewing and other defects.

The applicant has discovered a unique combination and arrangement of optical elements which provides for enhanced viewing of a display backlit with a thin, large aperture light source, thereby avoiding many of the disadvantages of prior known display devices.

SUMMARY OF THE INVENTION

The invention is a backlit display device and thin, large aperture light source for such a display device, the light source including an optical cavity bounded in part by a pair of opposing major walls, the, first major wall having a specularly reflective interior surface and the second major wall including an interior layer or film of transparent material whose interior surface is configured with an array of regularly spaced triangular prisms extending across the optical cavity substantially parallel with the ends thereof. The second wall also includes a diffuser which overlays the interior layer and a brightness enhancing film which overlays the diffuser, the brightness enhancing film being adapted to convert diffuse illumination into directed illumination falling predominantly within the desired viewing space. Finally, a planar, at least partially translucent message carrying member overlays the brightness enhancing film.

A light source is positioned to project light into the optical cavity from at least one end thereof. The light source may be formed of first and second opposing rows of light emitting diodes at opposite ends of the optical cavity, the light emitting diodes each being adapted and oriented to produce a light beam whose center line intersects the interior surface of the first major wall at a point substantially 40 percent of the length of the optical cavity from the end at which the diode is located.

DESCRIPTION OF THE PREFERRED EMBODIMENT

Figure 1:
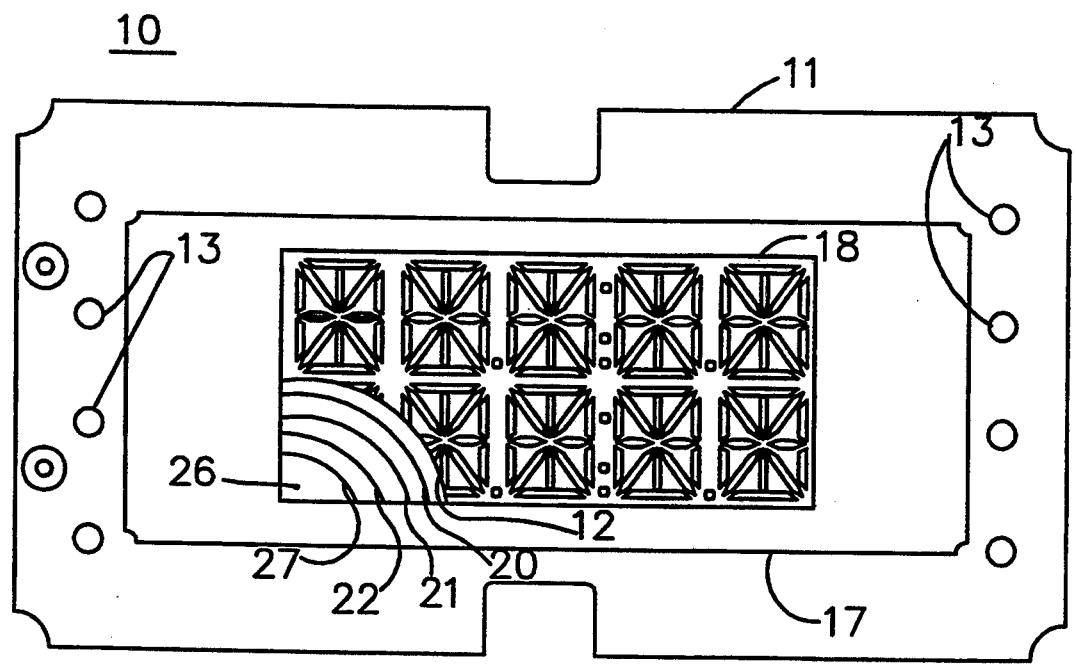
FIG. 1 is a frontal view of a display device in accordance with the applicant's invention, partially broken away to show internal optical layers.
Figure 2:
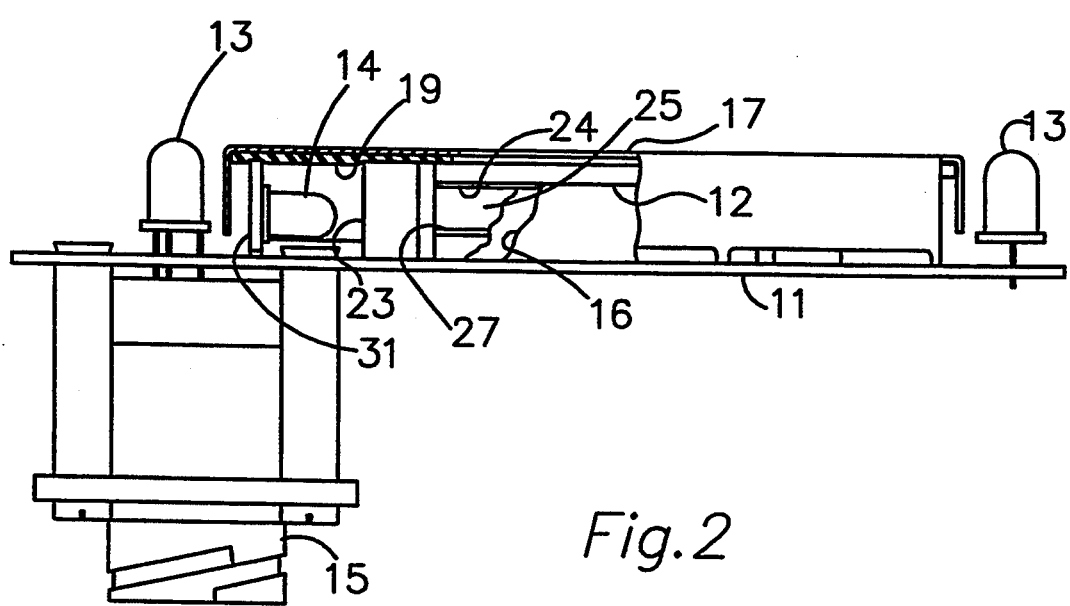
FIG. 2 is an edge view of the display device of FIG. 1, partially in section and partially broken away.

In FIGS. 1 and 2, reference numeral 10 generally identifies a display device in accordance with the applicant's invention. The invention pertains primarily to optical elements which, in the embodiment shown in FIGS. 1 and 2, are assembled on a printed circuit board 11. Circuit board 11 in addition to providing a structural base for the optical elements, carries electronic circuitry for selectively energizing segments of a liquid crystal display panel 12 and other indicator lamps, such as those identified by reference numeral 13, in addition to supplying electric power to backlighting lamps 14, as will be further described hereinafter, in response to signals received through an interface connector 15. Display panel 12 is electrically connected to circuit board 11 through edge connectors, of which one is identified by reference numeral 16 in FIG. 2.

Liquid crystal display panel 12 is one of several planar optical elements or layers sandwiched together and held in place between printed circuit board 11 and a bezel or cover 17 having an aperture 18 through which the display surface of liquid crystal display panel 12 can be viewed. Reference numeral 19 identifies a gasket between display panel 12 and cover 17.

Figure 3:
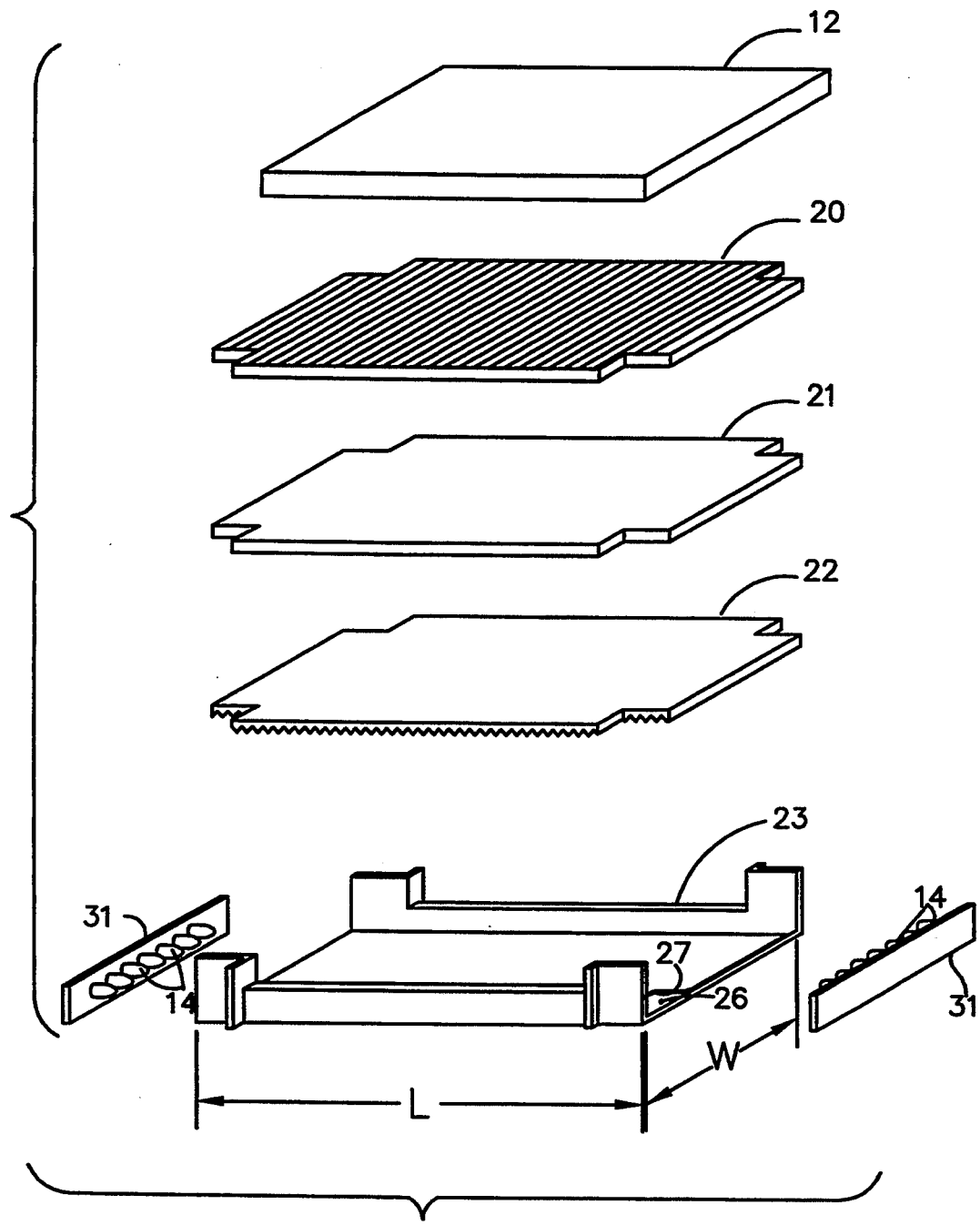
FIG. 3 is an exploded perspective view in simplified form of the principal optical elements in the display device of FIGS. 1 and 2.

Beneath liquid crystal display panel 12 are several optical layers, including a brightness enhancing film 20, a diffuser 21 and a transmissive right angle film 22, whose functions will be described in greater detail hereinafter. These elements are mounted on the open face of a shallow. open ended trough 23 which can be better visualized from examination of the exploded perspective view FIG. 3. Elements 20-22 form a lens assembly which provides one major wall (identified by reference numeral 24 in FIG. 2) of an optical cavity structure defining a high aspect ratio optical cavity 25 having a length L and a width W, as shown in FIG. 3.

A second major wall 26 of the optical cavity structure is formed by a bottom wall of trough 23. At least web 26 is provided with a specularly reflective interior surface 27, which may be in the form of a highly reflective film applied to the surface. A reflective polyester film product designated as Silverlux available through Minnesota Mining and Manufacturing Company has been found suitable for this application.

Backlighting illumination is provided by two rows of light emitting diodes 14 at the opposite ends of the optical cavity structure. The rows extend across the width of optical cavity 25. Each light emitting diode 14 is essentially a point source of light which projects a light beam along a center line identified by reference numeral 30 in FIG. 4. The light beam predominantly falls within a cone having an apical angle a of nominally 15 degrees for the diodes selected for this application. $\alpha$ represents the angle at which light output from diodes 14 drops to one half of its intensity on center line 30.

It has been found that best performance of display device 10, in terms of intensity and evenness of light distribution, is achieved by orienting light emitting diodes 14 so that their beam center lines 30 each intersect specular surface 27 at a point 40 percent of the length L of cavity 25 from the end at which the diode is located. This is accomplished by mounting diodes 14 on a pair of daughter boards 31 which are mounted on circuit board 11 at a slight angle from perpendicular to the board.

Figure 4:
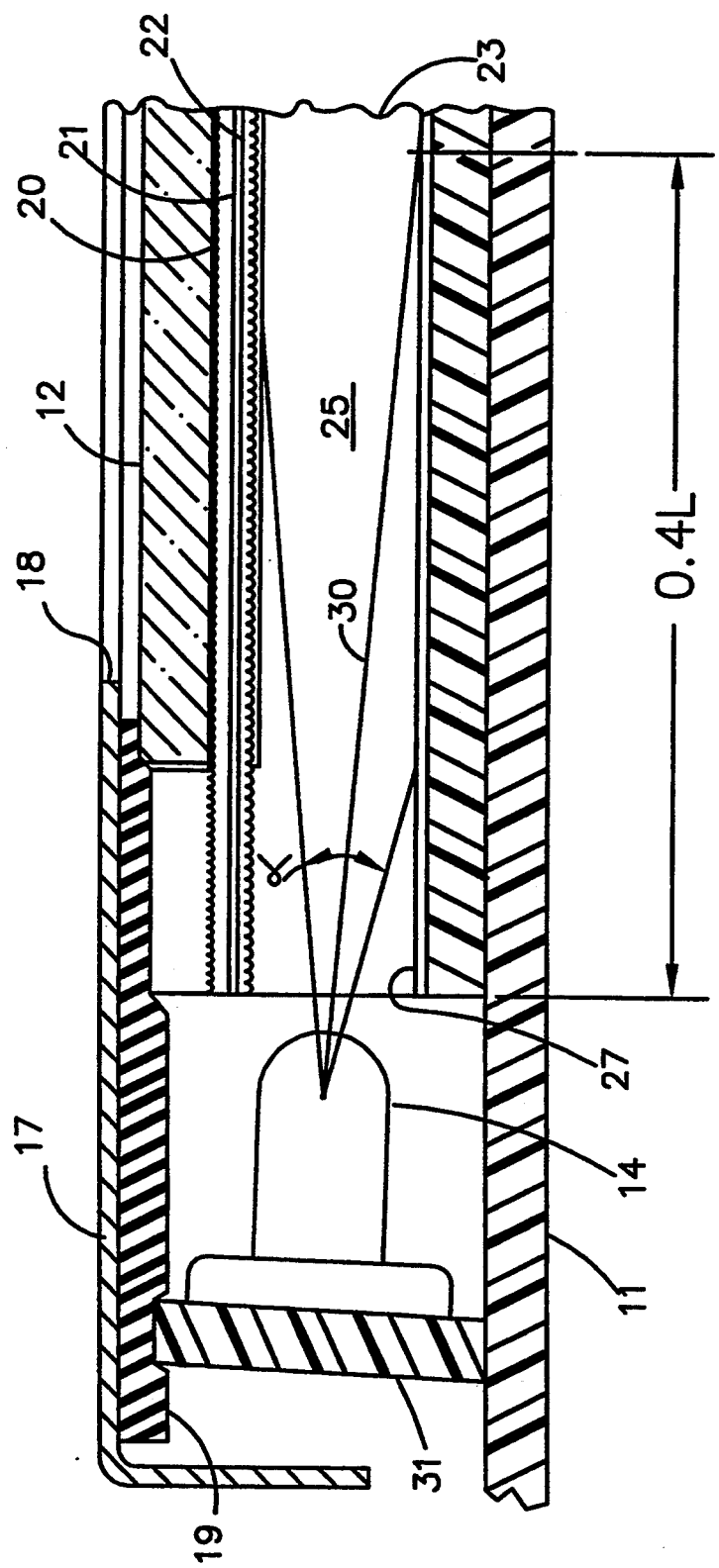
FIG. 4 is an enlarged partial cross sectional view of the display device of FIGS. 1 and 2, showing its internal geometry.

As is apparent from the above described geometry, and is most clearly illustrated in FIG. 4, light is transmitted to the inner surface of transmissive right angle film 22, which is the inner element of the lens assembly forming major wall 24 of the optical cavity structure, both directly from diodes 14 and indirectly from the diodes by means of reflection from specular surface 27. A general understanding of the light distribution characteristics of the lens assembly can be obtained from FIG. 5 which illustrates the paths taken by representative light rays.

Figure 5:
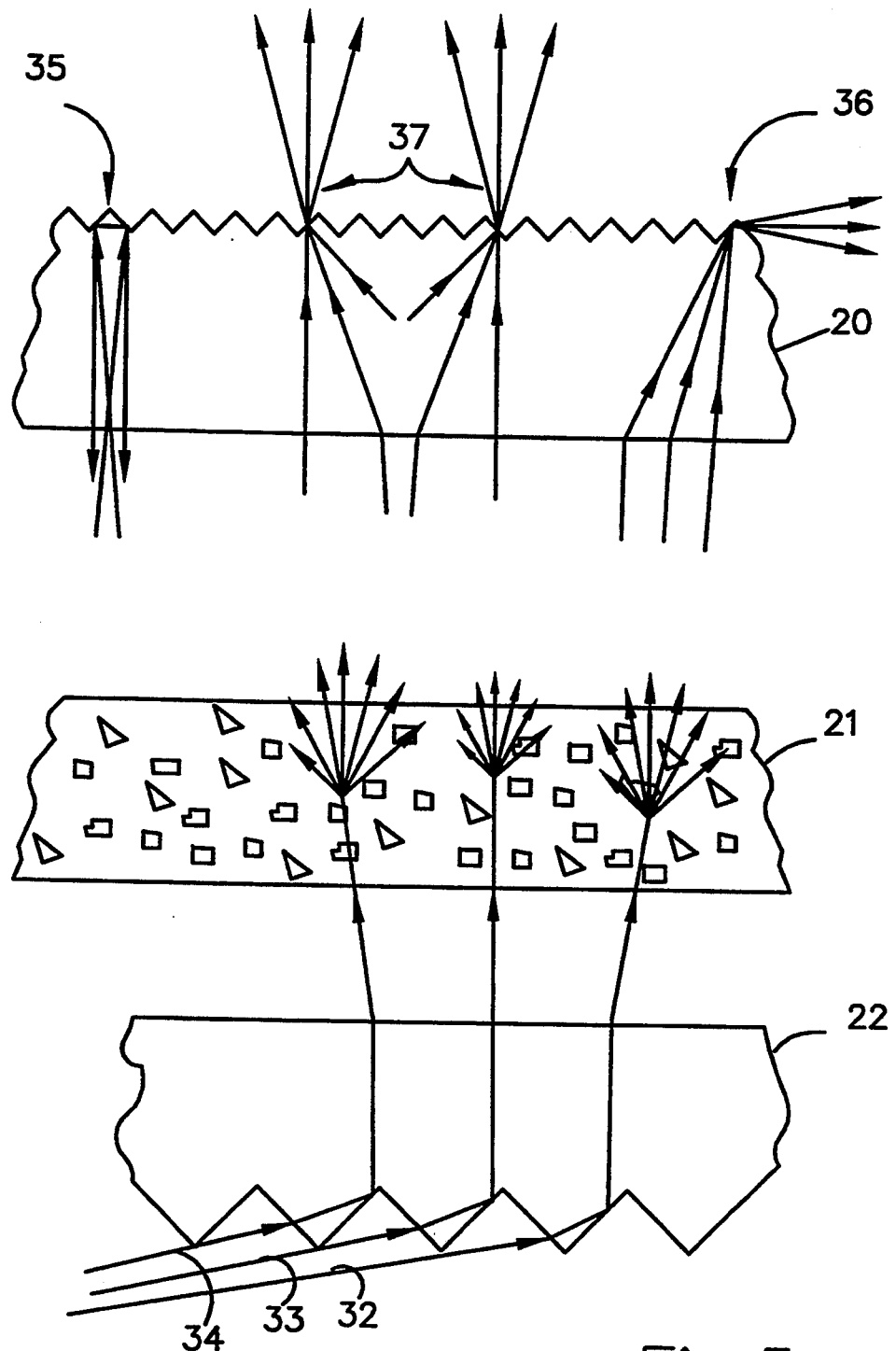
FIG. 5 is a much enlarged schematic representation in exploded form of certain optical layers in the display device of FIGS. 1 and 2, illustrating light processing within the device.

It is pointed out that the features illustrated in FIG. 5 are not to scale. In addition, the adjacent surfaces of films 20, 21 and 22 are preferably contiguous. The spaces in FIG. 5 between the films are provided only to facilitate a general description of the optical characteristics. Reference may be made to available product literature on brightness enhancing film 20, diffusion film 21 and transmissive right angle film 22 for more detailed information on these products.

As shown in FIGS. 4 and 5, the angle at which the predominant light rays arrive at the faceted surface of film 22 are within a few degrees from horizontal. The most horizontal rays travel directly from diode 14 to the end of film 22 most remote from the diodes which emitted the rays. The rays which arrive at the greatest angle from horizontal are those reflected from the end of specular surface 27 nearest the emitting diodes. Reference numerals 32, 33 and 34 identify rays within this range at progressively greater angles from horizontal.

As illustrated in FIG. 5, rays 32, 33 and 34 are subject to total internal reflection from the facets on the inner surface of film 22, and are redirected at approximately 90° from the original direction. Thus, the rays emerge from the surface of film 22 opposite the faceted surface thereof throughout a small range of angles from perpendicular to the plane of the film.

Light transmitted through film 22 is then dispersed over a wide range of directions by diffusion film 21 to achieve evenly distributed illumination. The light transmitted through diffusion film 21 is then supplied to brightness enhancing film 20 which functions to redirect a majority of the light to directions within angles bounding a desired viewing space. In particular, light transmitted to brightness enhancing film 20 internally is treated in one of three ways depending on the angle at which light rays enter the film.

As shown at reference numeral 35, light rays approaching film 20 at angles close to perpendicular to the film undergo double internal reflection from the facets on an outer faceted surface of the film, and returned to diffuser film 21 to be diffusely recycled. Light rays entering film 20 within a small range of angles slightly less than the angles which result in double internal reflection undergo reflection and refraction, and emerge from the faceted surface of the film in approximately horizontal directions, as shown at reference numeral 36. These rays represent a small amount of lost light. A majority of the light rays enter film 20 throughout a relatively broad range of angles less than the angles of rays at 35 and 36, and represent illumination useful for backlighting display panel 12. Such rays are shown at reference numeral 37. As illustrated, the rays entering film 20 within this range of angles are refracted by the faceted surface of the film, and emerge from the faceted surface distributed throughout a range of angles covering the desired viewing space for the display.

The applicant has discovered that the particular combination of elements and geometry described above results in a display device having significantly enhanced viewing properties. In particular, this arrangement maximizes the amount of illumination produced by the light source which is effectively used to backlight the display panel. This illumination is evenly distributed, thereby avoiding voids, "hot spots", streaking and other undesirable characteristics. It also directs a maximum amount of the illumination to within angles bounding the desired viewing space, resulting in uniform readability throughout a desired extended range of angles.

Accordingly, the applicant has provided a high aspect ratio, backlit display device having superior viewing characteristics. A particular embodiment is shown and described for illustrative purposes. However it is not intended that coverage be limited to that embodiment, but only by the terms of the following claims.

The embodiments of the invention in which an exclusive property or right is claimed are defined as follows:

1. A high aspect ratio, backlit display device with enhanced viewing properties, comprising:
    a message carrying member having a display surface of predetermined length and width of which at least a portion is translucent, said message carrying member having a first side from which the message is to be readable within a viewing space bounded by predetermined angles relative to the first side, said message carrying member having a second side opposite the first side;
    an optical structure having first and second generally parallel major walls at least partially enclosing a thin cavity having a length and width at least as great as the predetermined length and width of the display surface, the cavity having a first end substantially parallel with the width of the cavity and transverse to the first and second major walls thereof, the first major wall of said optical structure including an inner layer of transparent material having an interior surface bounding the cavity, an intermediate optical diffusion layer and an outer brightness enhancing film layer having an inner surface adjacent the diffusion layer and an outer surface adjacent the display surface, the interior surface of the inner layer and the outer surface of the outer layer each being configured with an array of regularly spaced triangular prisms parallel with the width of the cavity, the second major wall of said optical structure being adapted to provide specular reflection; and
    a light source adapted to project light from the end of the cavity onto the second major wall of said optical structure in a direction transverse to the triangular prisms on the inner layer at a small angle relative to an interior surface of the second major wall.

2. The display device of claim 1 wherein said light source is adapted and oriented to produce a light beam whose center line intersects the interior surface of the second major wall at a point substantially 40 percent of the length of the optical cavity from the end thereof at which said light source is located.

3. The display device of claim 2 wherein said light source comprises first and second pluralities of light emitting diodes located at first and second opposing ends of the cavity respectively.

4. The display device of claim 3 wherein the first and second pluralities of light emitting diodes each comprise a linear array of light emitting diodes substantially parallel to the first and second major walls of the optical structure.

5. The display device of claim 4 wherein each of the diodes in the first and second pluralities of light emitting diodes produce a light beam having a half peak intensity aperture of substantially 15°.

6. The display device claim 5 wherein said message carrying member is a liquid crystal display panel which is translucent when unenergized, and having a plurality of selectively energizable display segments which become substantially opaque when energized.

7. The display device of claim 6 wherein said optical structure is mounted on a printed circuit board with the second major wall of said optical cavity structure being adjacent printed circuit board, said optical structure being located between opposing rows of light emitting diodes carried on said printed circuit board and forming said light source, said printed circuit board also carrying electronic circuitry for selectively energizing the display segments of said liquid crystal display panel.

8. A high aspect ratio illumination source for backlighting a planar, at least partially translucent, display surface with directed illumination predominantly falling within a viewing space bounded by predetermined angles relative to the display surface, the display surface having a predetermined length and width, the light source comprising:
    an optical cavity structure defining an optical cavity having opposite ends, and having a length and width at least equal to the predetermined length and width of the display surface, said optical cavity structure having a first major wall with an interior surface adapted to provide specular reflection and a second major wall including an interior layer of transparent material, the interior layer of transparent material having an interior surface configured with an array of regularly spaced triangular prisms extending across the optical cavity substantially parallel with the ends thereof;
    a light source adapted to project light into the optical cavity from at least one end thereof;
    a diffusion layer overlaying the exterior surface the interior layer of transparent material in the second major wall of said optical cavity structure; and
    a brightness enhancing film overlaying said diffusion layer, said brightness enhancing film having a first surface adjacent said diffusion layer and a second opposing surface configured with an array of regularly spaced triangular prisms parallel with the triangular prisms formed in the interior layer of the second major wall of said optical cavity structure, the prisms on said brightness enhancing film having faces whose included angles and angular orientations relative to the first surface of said brightness enhancing film provide directed illumination predominantly between the predetermined angles bounding the viewing space.

9. The high aspect ratio illumination source of claim 8 wherein said light source is adapted to produce a light beam whose center line intersects the interior surface of the first major wall of said optical cavity structure at a point substantially 40 percent of the length of the optical cavity from said at least one end thereof.

10. The high aspect ratio illumination source of claim 9 wherein the light source comprises first and second opposing rows of light emitting diodes said opposite ends of the optical cavity, each light emitting diode producing a light beam having a half peak intensity aperture of substantially 15 °.

* * * * *

UNITED STATES PATENT AND TRADEMARK OFFICE
CERTIFICATE OF CORRECTION

PATENT NO. : 5,381,309
DATED : January 10, 1995
INVENTOR(S) : Jerry L. Borchardt It is certified that error appears in the above-identified patent and that said Letters Patent is hereby corrected as shown below:

```
Column 6, line 7, cancel "optical";
         line 29, cancel "cavity";
         line 30, after "adjacent" insert --the--.

Column 8, line 5, after "diodes" insert --at--.
```

Signed and Sealed this

Sixteenth Day of May, 1995

*Attest:*

BRUCE LEHMAN

*Attesting Officer*  *Commissioner of Patents and Trademarks*